A. PFLUEGNER.
ANTISKIDDING DEVICE.
APPLICATION FILED MAR. 2, 1910.
969,116.
Patented Aug. 30, 1910.
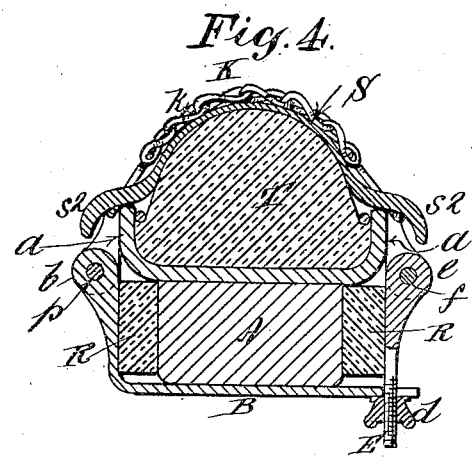
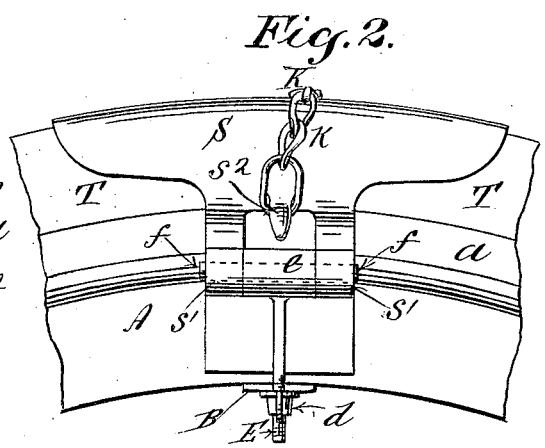
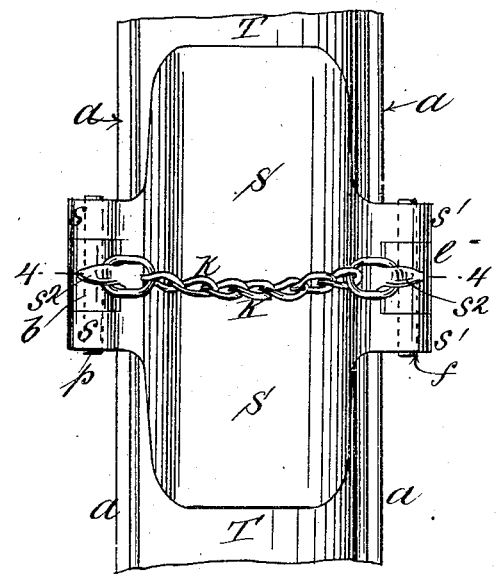
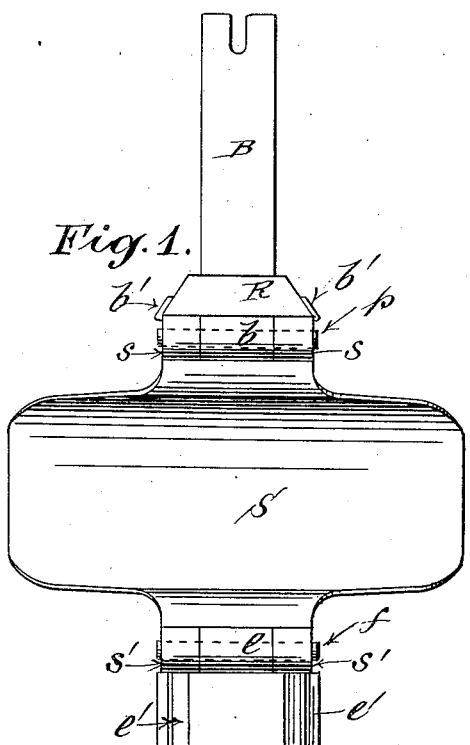
Inventor:
Augustus Pfluegner
By his Attorney
Geo. Wm. Miatt

UNITED STATES PATENT OFFICE.

AUGUSTUS PFLUEGNER, OF NEW YORK, N. Y.

ANTISKIDDING DEVICE.

969,116. Specification of Letters Patent. Patented Aug. 30, 1910.

Application filed March 2, 1910. Serial No. 546,787.

*To all whom it may concern:*

Be it known that I, AUGUSTUS PFLUEGNER, formerly a subject of the Emperor of Germany, having declared my intention of becoming a citizen of the United States, residing in the city of New York, borough of Brooklyn, county of Kings, and State of New York, have invented certain new and useful Improvements in Antiskidding Devices, of which the following is a specification.

My invention relates to anti-skid devices for wheel tires, and consists in the specific construction and arrangement of parts herein described and claimed.

In the accompanying drawings, Figure 1, is an inside view of the device opened up; Fig. 2, is a side elevation of the device applied to a wheel tire; Fig. 3, is a top view of the same; Fig. 4, is a transverse section upon plane of line 4—4 Fig. 3.

A, represents the wooden felly of the wheel to the metallic rim $a$, of which the rubber tire T, is applied, in any desired or well known manner. The form of the tire T, shown in the drawing by way of illustration is of solid rubber, but a pneumatic tube and mountings may be substituted therefor, without departing from the spirit and intent of my invention. A distinguishing feature is the specific construction of the oblong metallic shield S, adapted to fit over the periphery of the tire T, and secured to the rim by suitable clamping mechanism.

In the construction shown in the drawings, the shield plate is formed with side knuckles $s$, $s$, and $s'$, $s'$. Between the knuckles $s$, $s$, fits the looped end $b$, of the strap B, secured in position by the pintle $p$. This strap B is adapted to be swung over the inner surface of the wooden felly A, as shown in Fig. 4, where it is secured by a nut $d$, on the clamping member E, the looped inner end $e$, being secured between the knuckles $s'$, $s'$, by the pintle $f$.

The strap B and the clamping member E, are each provided with rubber cushions R, mounted thereon in any suitable manner (as by the flanges $b'$, and $e'$) and arranged to bear on the sides of the wooden felly A, when the device is clamped in position, thereby protecting the felly A, against abrasion and insuring a firm frictional contact which will prevent the creeping of the device upon the rim.

The anti-skidding member $k$, consists of an articulated band K, extending transversely across the outer surface of the shield S, and secured thereto by suitable means, That shown in the drawings consisting simply of a chain section, the end loops of which are passed over the hooks $s^2$, formed on the sides of the shield. In lieu of the chain shown, it is obvious that any of the articulated anti-skid bands known in the state of the art may be substituted with like result, and I do not therefore confine myself in this respect, although the chain is a simple, cheap and effective anti-skid member which, when arranged as shown in the drawings may be quickly detached from or replaced upon the shield.

The shield may be used to cover and protect a puncture in the shoe of a pneumatic tire, relieving the punctured portion by distributing the strain on either side thereof, keeping the cut closed, and thereby preventing the blowing out of the pneumatic tire.

Any desired number of my anti-skid devices may be used upon a wheel, and when more than one is used, they are preferably arranged at equal distances apart around the rim.

By the use of my shield S, interposed between the anti-skid member $k$, and the tire T, I effectually protect the latter against the wear and tear of the anti-skid member, and thereby lengthen the life and usefulness of the tire without decreasing the efficiency of the anti-skid member.

What I claim as my invention and desire to secure by Letters Patent is,

A device of the character described, comprising the metallic shield S formed with side hooks $s^2$, $s^2$, and knuckles $s$, $s$, $s'$, $s'$, the bifurcated strap B, formed with a looped end $b$, the pintle $p$, by which the strap B, is hinged to the shield S, the clamping member E, formed with a loop $e$, the pintle $f$, by which the clamp member E, is hinged to the shield S, the nut $d$, on the clamping member E, and the articulated anti-skid member $k$, formed with end loops engaging with the side hooks $s^2$, $s^2$, on the shield S, substantially in the manner and for the purpose described.

AUGUSTUS PFLUEGNER.

Witnesses:
D. W. GARDNER,
GEO. WM. MIATT.